Patented Aug. 1, 1939

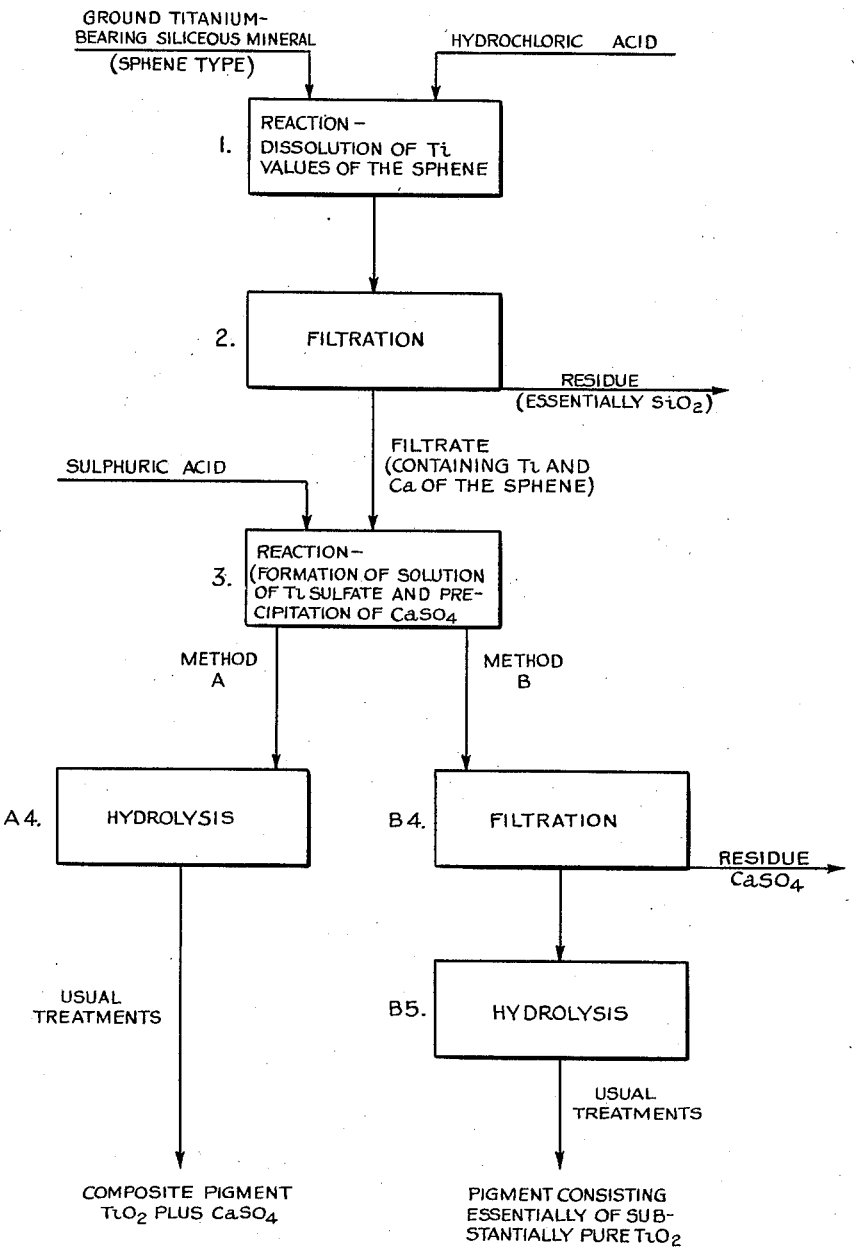

2,167,626

UNITED STATES PATENT OFFICE 2,167,626

PREPARATION OF TITANIUM DIOXIDE PIGMENTS

Hugh V. Alessandroni, New York, N. Y., assignor to National Lead Company, New York, N. Y., a corporation of New Jersey Application October 6, 1937, Serial No. 167,565

12 Claims. (Cl. 134—58)

This invention relates to a method of preparing titanium dioxide pigments from titanium-bearing siliceous minerals of the class of sphene.

Titanium, although widely distributed throughout the world in vast quantities (it is the ninth most abundant element), has found but few commercial uses. As the dioxide, $TiO_2$, it is finding ever increasing use as a white pigment but this use is in no way proportionate to the vast quantities of the element available. Among the reasons why titanium has not found more general use is the highly refractive nature of titaniferous minerals which yield their titanium constituent only after exhaustive and expensive treatments. Consequently, those industries which find a use for titanium, particularly the titanium pigment industry have turned to ilmenite (commonly regarded as ferrous titanate, $FeTiO_3$) which is relatively easily sulfated to give water-soluble sulfates of iron and titanium as a source of raw material and have almost completely neglected other titaniferous materials. One such class of neglected minerals is that in which both titanium and silica are present in addition to other elements, particularly alkali and alkaline-earth metals, e. g., calcium and magnesium. The mineral sphene corresponding more or less to the formula $CaTiSiO_5$, is representative of this class, which are generally termed "titano-silicates". Minerals of this class of which there are large deposits would constitute a valuable source of titanium if economical and efficient methods of recovering the titanium values were devised. The present invention sets forth an economical and practical method of utilizing titanium-bearing siliceous minerals in the preparation of titanium dioxide pigments.

In my co-pending application Serial No. 167,566, filed October 6, 1937 I have disclosed a method for beneficiating titanium-bearing siliceous minerals by means of which their titanium values may be made available for useful purposes. The method therein disclosed broadly comprises treating a ground titanium-bearing siliceous mineral with hydrochloric acid not exceeding about 15 percent in strength and preferably between about 10 percent and 12 percent at elevated temperatures to dissolve all hydrochloric acid-soluble constituents of the mineral and to leave a residue consisting essentially of hydrated titanium oxides and silica. In connection with my investigations upon which the aforementioned co-pending application as well as the present application are based, I discovered that when the strength of the hydrochloric acid is increased much over about 12 percent and particularly over 15 percent, the titanium values of the mineral tend to be taken into solution and therein retained.

The present invention which is based upon this discovery includes an entire process for the preparation of titanium dioxide, as either substantially pure dioxide or as a composite pigment of calcium sulfate and titanium dioxide. It may be understood in its broad aspects by reference to the flow-sheet attached hereto.

Ground titanium-bearing siliceous mineral, e. g., sphene ($CaTiSiO_5$) is mixed with hydrochloric acid of a strength preferably above 15 percent and heated. In the reaction which takes place, 1 of the figure, the titanium values and the other constituents which are soluble in hydrochloric acid, such as the calcium and magnesium are dissolved in the acid, leaving a residue which is essentially silica. After the reaction is complete the residue is separated as by filtration from the supernatant liquid 2. The liquid contains, as the chlorides thereof, the titanium, calcium and magnesium originally present in the mineral together with other hydrochloric acid-soluble constituents present in the ore in minor amounts. Sulfuric acid is then added to the filtrate to convert the chlorides of titanium, calcium, magnesium, etc., to sulfates 3. The concentration of the sulfuric acid, the rate of admixture and the temperature may be so controlled that the calcium sulfate is precipitated as anhydrite. If substantially pure titanium dioxide is desired, the precipitated calcium sulfate is removed as by filtration, etc, B4. The hydrochloric acid contained in the solution may now be conveniently removed, e. g., by distillation under reduced pressure, and recovered for future use. The solution now contains primarily titanium sulfate and magnesium sulfate. By subjecting this solution to the well-known thermal hydrolysis B5 and treating the precipitated hydrous titanium oxide in the usual manner, i. e., washing, calcining, pulverizing, etc., a high grade titanium dioxide useful as a pigment may be obtained.

If a composite calcium sulfate-titanium dioxide pigment is desired the calcium sulfate is not removed but the solution is subjected directly to thermal hydrolysis (A4), preferably after removing the hydrochloric acid. After the usual treatment the pricipitated calcium sulfate-hydrous titanium oxide yields a very acceptable composite pigment.

It will, therefore, be seen that among the various objects of my invention the principal one is a method for the preparation of titanium dioxide pigments from titanium-bearing siliceous minerals.

The important factors of my invention will now be fully explained.

The titanium-bearing siliceous mineral, e. g., sphene, should be finely ground, say to a particle size of between about 100 and 200 mesh. The strength of the acid should be above about 12 percent to say about 30 percent and preferably between about 15 percent and 20 percent. The amount of acid employed should in all cases be at least sufficient to furnish enough acid molecules to combine with all elements present in the mineral which are capable of forming either non-hydrolyzable or hydrolyzable salts, i. e., sufficient hydrochloric acid to form chlorides of the calcium, magnesium, aluminum, titanium, etc., present in the mineral. However, to expedite the treatment of the mineral and to obtain the maximum yield of recoverable titanium in the shortest time it is desirable to use an excess of hydrochloric acid over that theoretically required, for instance, an excess of between about 10 percent to 20 percent HCl. The mixing of the ground mineral and hydrochloric acid may most conveniently be carried out at room temperature in the reaction vessel, which for the sake of economy ought to be equipped with a reflux condenser for catching, condensing and returning to the zone of reaction the volatilized hydrochloric acid vapors.

The liquid mixture of acid and ground mineral is next heated at temperatures above about 40° C. and up to the boiling point of the liquid portion of the mixture. If no reflux condenser is employed the temperature should be maintained below the boiling point in order to conserve hydrochloric acid; with a reflux condenser the boiling temperature is to be preferred. In order to avoid losing free hydrogen chloride, even when employing a reflux, it may be necessary to heat the reaction mixture for several hours between about 40° C. and 50° C. and during the next 24 hours gradually to raise the temperature to the boiling point. The heating is continued until a maximum recovery of titanium is obtained which may be determined by noting, from time to time, the decrease in free acidity of the reaction mixture, calculating therefrom the combined acid and comparing these figures with an analysis of the mineral, previously made.

When operating on titanium-bearing siliceous minerals containing polyvalent elements, such as iron, which are more readily attacked by the acid in their condition of lowest valence or which in their condition of highest valence yield hydrolyzable salts but in their condition of lowest valence non-hydrolyzable salts, it is desirable to add to the reaction mixture and to carry out the reaction in the presence of a small amount, e. g., 1.0–2.0 percent of a water-soluble reducing agent such as titanous chloride, $TiCl_3$, or stannous chloride, $SnCl_2$. However in such cases the reducing agent should not be so large as to reduce any appreciable amount of titanium, it being known that all other reducible elements in admixture with titanium are preferentially reduced before the titanium.

After reaction, the solution will contain dissolved therein, hydroyzable chlorides, i. e., the titanium chloride, and non-hydrolyzable chlorides, i. e., the calcium, magnesium, aluminum, ferric, and other chlorides, some free hydrochloric acid and an insoluble residue consisting primarily of silica. The solution is allowed to cool during which the siliceous residue settles. After settling the supernatant liquor is separated from the residue as by decantation or syphoning. The residue is washed, e. g., on a suitable filter, with water or aqueous hydrochloric acid and the washings added to the liquid portion of the reaction liquor.

The solution may now be treated with sulfuric acid to liberate the chloride content as hydrochloric acid thereby converting the titanium chloride to sulfate and forming insoluble alkaline-earth sulfates of the alkaline-earth constituents of the mineral. The temperatures and concentrations and manner of mixing in this step may be so controlled as to yield finely divided, roundish particles of calcium sulfate which X-ray and microscopic examination prove to be anhydrite. For example, the solution may be added to an excess of strong sulfuric acid, preferably over 70 percent strength, while controlling the temperature at a point above 70° C. which may be obtained either from the combined heat of reaction and dilution of the sulfuric acid, or by applying external heat or by preheating the reactants. According to whether a substantially pure titanium dioxide pigment or a composite titanium dioxide-calcium sulfate pigment is desired the precipitated calcium sulfate is removed (Method B of the figure) or allowed to remain in suspension in the solution (Method A of the figure). Whether or not the calcium sulfate is removed, the solution will now be found to be relatively weak as to the titanium content, containing in many cases, below 5.0 percent titanium, calculated as $TiO_2$. The solution may then be concentrated while simultaneously removing the free hydrochloric acid and adjusting the ratio of $H_2SO_4$ to $TiO_2$ in the solution. The concentration may be effected by evaporation, preferably under reduced pressure. The hydrochloric acid recovered may be concentrated and used again with a subsequent batch of ground titanium-bearing siliceous mineral. The titanium content may be concentrated to any desired amount, say between 10 percent and 20 percent $TiO_2$ and the ratio of $H_2SO_4$ to $TiO_2$ adjusted to any figure suitable for the subsequent hydrolysis, preferably to a mol. ratio of $TiO_2:SO_3$ of from 1:1 to 2. The adjustment of the ratio of $H_2SO_4$ to $TiO_2$ will usually be effected by adding more sulfuric acid. If it be desired to remove part of the sulfuric acid, this may be done by adding a neutralizing agent, e. g., an oxide, hydroxide or carbonate of alkali or alkaline-earth metal, whose sulfate is soluble or insoluble in the solution. Within the scope of my invention the order of these steps may be varied considerably.

The thermal hydrolysis and the subsequent treatment such as the washing, calcination, pulverization and the like are then carried out in the well-known manner. Preferably, the solution should be subjected to a reducing treatment prior to hydrolysis to reduce all the iron present to the ferrous state and a small part of the titanium. It will be understood that by allowing the residue of silica formed during the initial treatment to remain in the solution and carrying out my invention according to Method B of the figure, a tertiary composite pigment consisting essentially of silica, calcium sulfate and titanium dioxide will be obtained.

The following example will illustrate my invention but the conditions set forth therein are not to be taken as fixing limits to the breadth thereof:

Example No. 1

One thousand pounds of sphene, ground so as to allow not more than 10 percent retention on a 100 mesh screen, were stirred into 8300 lbs. of 29.5 percent hydrochloric acid in a reaction vessel designed to accommodate a reflux condenser. The analysis of the sphene and the gram-equivalents of HCl per 100 grams of sphene were:

| Analysis of sphene | | Grams HCl equivalent to 100 g. sphene |
|---|---|---|
| Component | Percent | |
| MgO | 1.12 | 2.02 |
| CaO | 18.65 | 24.3 |
| SiO$_2$ | 29.58 | |
| TiO$_2$ | 32.00 | 58.4 |
| FeO | 1.43 | 1.45 |
| Fe$_2$O$_3$ | 4.20 | 5.75 |
| Al$_2$O$_3$ | 12.94 | 27.8 |
| MnO | 0.10 | 0.15 |

After fitting the reflux to the reaction vessel, the temperature of the mixture was raised to about 40° C. and maintained there for about 3-4 hours in order to avoid losing free HCl before appreciable reaction had taken place. Throughout the next 24 hours the temperature was gradually raised to the boiling point at about 107° C. The rate of reaction had become so low by the end of this time that the heating was discontinued, the reaction mixture allowed to cool, while the siliceous residue settled. The residue was removed by filtration, it was washed with dilute hydrochloric acid and the washings added to the liquid portion of the reaction mixture.

The residue weighed about 372 lbs. It analyzed:

| | Pounds |
|---|---|
| SiO$_2$ | 327 |
| Fe$_2$O$_3$ | 25 |
| TiO$_2$ | 20 |

The filtrate and washings analyzed:

| | | |
|---|---|---|
| TiO$_2$ | lbs | 300 = (3.0% soln.) |
| Free HCl | lbs | 1420 = (15.6% soln.) |
| CaCl$_2$ | lbs | 369 |
| Sp. gr. | | 1.190 |
| Total weight | | 9100 |
| Yield soluble TiO$_2$ percent | | 94 |

The solution was divided into two equal portions, each weighing about 4550 lbs., one portion was treated according to Method A of the figure and the other according to Method B of the figure.

Example No. 2—Method B

The solution was mixed with about 475 lbs. of 93 percent sulfuric acid to precipitate the calcium as calcium sulfate, to liberate free HCl and to give a ratio of TiO$_2$:SO$_3$ of about 1:1.5. The calcium sulfate was removed by filtration. The solution, free of calcium sulfate, was concentrated in a vacuum evaporator, to a TiO$_2$ content of about 12 percent, while the hydrochloric acid which was completely removed from the solution was recovered as a condensate. The concentrated solution was reduced with zinc dust to reduce all the iron present to the ferrous state and a small amount of titanium to the titanous state. It was then subjected to the usual hydrolysis by boiling until substantially all of the titanium dioxide was precipitated as hydrous titanium oxide. This hydrous titanium oxide was washed, calcined and pulverized in the well-known manner. A substantially pure titanium dioxide pigment whose color, tinting strength and other pigment properties compared favorably with those prepared according to prior art methods was thus obtained.

Example No. 3—Method A

The solution was mixed with about 475 grams of 93 percent sulfuric acid to precipitate calcium sulfate, to liberate free HCl and to give a ratio of TiO$_2$:SO$_3$ of about 1:1.5. The temperature of the mixing was maintained above 70° C. so as to form anhydrite calcium sulfate. The solution was then directly concentrated to a TiO$_2$ content of about 12 percent while recovering the hydrochloric acid. It was then further processed as described under Example No. 2, Method B, to obtain a composite titanium dioxide-calcium sulfate pigment containing about 40 percent TiO$_2$ and 60 percent CaSO$_4$. Its color, tinting strength and other pigment properties were on a par with prior art composite pigments of similar composition.

My invention is susceptible of many variations, all within its scope. For instance, when proceeding according to either Method A or Method B various extender pigments, such as barium sulfate, silica (obtained, for example, from the practice of the invention) may be added to the hydrolysis solution, or to the hydrous titanium oxide prior to calcination, or to the titanium dioxide after calcination to obtain secondary or tertiary composite pigments.

The pigments of the present invention find application in many industrial arts. With film-forming vehicles they make excellent surface coating compositions. Such vehicles may consist of the usual oleaginous or oleoresinous type or may be of the nitro-cellulosic or cellulose acetate type. They may be employed to opacify and brighten paper either as a filler or as a coating material. They may be used as fillers for rubber or artificial plastics. In fact, they find use wherever titanium dioxide pigments of the prior art have been employed.

This description of my invention has been given for clearness of understanding and no undue limitation should be deduced therefrom but the appended claims should be construed as broadly as possible in view of the prior art.

I claim:

1. A process for the preparation of titanium dioxide pigments from titanium-bearing siliceous minerals containing alkaline earth metals which comprises grinding such a titanium-bearing siliceous mineral, mixing the said ground mineral with aqueous hydrochloric acid having a concentration above about 12.0 percent, heating the resulting mixture until all constituents of the said mineral which are capable of forming hydrolyzable and non-hydrolyzable hydrochloric acid-soluble chlorides are dissolved in the hydrochloric acid, mixing the resulting solution with at least sufficient sulfuric acid to convert the said chlorides to sulfates and hydrolyzing the resulting solution in order to precipitate the titanium contained therein as hydrous titanium oxide, washing, calcining and pulverizing the same.

2. A process for the preparation of titanium dioxide pigments from titanium-bearing siliceous minerals containing alkaline earth metals which comprises grinding such a titanium-bearing siliceous mineral, mixing the said ground mineral with aqueous hydrochloric acid having a concentration above about 12.0 percent, heating the resulting mixture until all constituents of the said mineral which are capable of forming hydrolyzable and non-hydrolyzable hydrochloric acid-soluble chlorides are dissolved in the hydrochloric acid, separating the solution thus obtained from any insoluble residual siliceous constituents of the mineral, mixing the resulting solution with at least sufficient sulfuric acid to convert the said chlorides to sulfates, removing substantially all the hydrogen chloride present in the sulfuric acid-treated solution and hydrolyzing the resulting solution in order to precipitate the titanium contained therein as hydrous titanium oxide together with any insoluble alkaline earth metal sulfates present therein, washing, calcining and pulverizing the same.

3. A process for the preparation of titanium dioxide pigments from titanium-bearing siliceous minerals containing alkaline earth metals which comprises grinding such a titanium-bearing siliceous mineral, mixing the said ground mineral with aqueous hydrochloric acid having a concentration above about 12.0 percent, heating the resulting mixture until all constituents of the said mineral which are capable of forming hydrolyzable and non-hydrolyzable hydrochloric acid-soluble chlorides are dissolved in the hydrochloric acid, mixing the resulting solution with at least sufficient sulfuric acid to convert the said chlorides to sulfates, removing substantially all the hydrogen chloride present in the sulfuric acid-treated solution as well as any insoluble sulfates thereby formed together with any insoluble residual siliceous constituents of the mineral and hydrolyzing the resulting solution in order to precipitate the titanium contained therein as hydrous titanium oxide, washing, calcining and pulverizing the same.

4. A process for the preparation of titanium dioxide pigments from titanium-bearing siliceous minerals containing alkaline earth metals which comprises grinding such a titanium-bearing siliceous mineral, mixing the said ground mineral with at least sufficient aqueous hydrochloric acid having a concentration between about 15.0 percent and about 30.0 percent to combine with all the constituents of the mineral which are capable of forming hydrolyzable and non-hydrolyzable hydrochloric acid-soluble chlorides, heating the resulting mixture until all the said constituents of the mineral are dissolved in the hydrochloric acid, mixing the resulting solution with sulfuric acid to convert the said chlorides to sulfates, adjusting the sulfuric acid concentration to the titanium dioxide content of the solution to a ratio of $TiO_2:SO_3$ of about 1:1 to 2 and heating the resulting solution in order hydrolytically to precipitate the titanium contained therein as hydrous titanium oxide, washing, calcining and pulverizing the same.

5. A process for the preparation of titanium dioxide pigments from titanium-bearing siliceous minerals containing alkaline earth metals which comprises grinding such a titanium-bearing siliceous mineral, mixing the said ground mineral with at least sufficient aqueous hydrochloric acid having a concentration between about 15.0 percent and about 30.0 percent to combine with all the constituents of the mineral which are capable of forming hydrolyzable and non-hydrolyzable hydrochloric acid-soluble chlorides, heating the resulting mixture until substantially all the said constituents of the mineral are dissolved in the hydrochloric acid, separating the solution thus obtained from any insoluble residual siliceous constituents of the mineral, mixing the resulting solution with sulfuric acid to convert the said chlorides to sulfates, adjusting the sulfuric acid concentration to the titanium dioxide content of the solution to a ratio of $TiO_2:SO_3$ of about 1:1 to 2, removing substantially all the hydrogen chloride present in the sulfuric acid-treated solution and heating the resulting solution in order to hydrolytically precipitate the titanium contained therein as hydrous titanium oxide together with any insoluble alkaline earth metal sulfates present therein, washing, calcining and pulverizing the same.

6. A process for the preparation of titanium dioxide pigments from titanium-bearing siliceous minerals containing alkaline earth metals which comprises grinding such a titanium-bearing siliceous mineral, mixing the said ground mineral with at least sufficient aqueous hydrochloric acid having a concentration between about 15.0 percent and about 30.0 percent to combine with all the constituents of the mineral which are capable of forming hydrolyzable and non-hydrolyzable hydrochloric acid-soluble chlorides, heating the resulting mixture until substantially all the said constituents of the mineral are dissolved in the hydrochloric acid, mixing the resulting solution with sulfuric acid to convert the said chlorides to sulfates, separating the solution from any insoluble sulfates thereby formed together with any insoluble residual siliceous constituents of the mineral, removing substantially all the hydrogen chloride present in the sulfuric acid-treated solution, adjusting the sulfuric acid concentration to the titanium dioxide content of the solution to a ratio of $TiO_2:SO_3$ of about 1:1 to 2 and heating the resulting solution in order to hydrolytically precipitate the titanium contained therein as hydrous titanium oxide, washing, calcining and pulverizing the same.

7. A process as specified in claim 5 wherein the titanium-bearing siliceous mineral employed is sphene and, in which the admixture of the chloride-containing solution with sulfuric acid is carried out under conditions of concentration and temperature to obtain anhydrite calcium sulfate from the reaction between the sulfuric acid and calcium chloride contained in the said solution.

8. A process as specified in claim 5 wherein the titanium-bearing siliceous mineral employed is sphene and, in which sulfuric acid of at least 70.0 percent concentration is admixed with the chloride-containing solution while maintaining temperature conditions during the mixing of not less than 70° C. to obtain anhydrite calcium sulfate from the reaction between the sulfuric acid and calcium chloride contained in the said solution.

9. In a process for preparing titanium dioxide pigments from titanium-bearing siliceous minerals containing alkaline earth metals which includes the heating of a mixture of aqueous hydrochloric acid having a concentration above about 12.0 percent and ground titanium-bearing siliceous mineral, the steps which consist of forming a mixture of ground titanium-bearing siliceous mineral, hydrochloric acid having a concentration of above about 12.0 percent and a small amount of a hydrochloric acid-soluble reducing agent and heating the resulting mixture.

10. In a process for preparing titanium dioxide pigments from titanium-bearing siliceous minerals containing alkaline earth metals which includes the heating af a mixture of aqueous hydrochloric acid having a concentration above about 12.0 percent and ground titanium-bearing siliceous mineral, the steps which consist in forming a mixture of ground titanium-bearing siliceous mineral, hydrochloric acid having a concentration above about 12.0 percent and a small amount of a reducing agent selected from the group consisting of titanous chloride and stannous chloride and heating the resulting mixture.

11. A process as specified in claim 2 in which the insoluble residual siliceous constituents separated from the chloride-containing solution are purified and the resultant purified silica reintroduced into the process ultimately to form a composite pigment consisting substantially of titanium dioxide, alkaline earth metal sulfate and silica.

12. A process as specified in claim 3 in which the insoluble residual siliceous constituents separated from the chloride-containing solution are purified and the resultant purified silica reintroduced into the process ultimately to form a composite pigment consisting substantially of titanium dioxide and silica.

HUGH V. ALESSANDRONI.